Oct. 8, 1968     O. G. H. JUNGNER     3,404,780

AUTOMATIC FILTER

Filed July 29, 1965

United States Patent Office 3,404,780
Patented Oct. 8, 1968

3,404,780
AUTOMATIC FILTER
Olof Gunnar Hugo Jungner, Hovas, Sweden, assignor to Centrala Automationslaboratoriet AB—CALAB, Stockholm, Sweden, a company
Filed July 29, 1965, Ser. No. 475,693
Claims priority, application Sweden, May 25, 1965, 6,880
2 Claims. (Cl. 210—142)

ABSTRACT OF THE DISCLOSURE

An automatic medical fluid filter comprising three cylindrical blocks disposed adjacent to each other on a common central axis and having a number of equally spaced apart parallel channels extending therethrough parallel to said axis and disposed in a circle concentric to said axis and connectible to medical test fluids, reagents, solvent fluids, vacuum and washing fluid. A regeneratable sintered glass filter is disposed in each channel of the intermediate block and said intermediate block is rotatable around said axis to sequentially connect each filter to each of the channels extending through the outer blocks. The number of filters is a multiple of the working operations to be carried out by each filter.

---

When carrying out medical and industrial laboratory tests it is often necessary to repeatedly filter various preparations or tests of the same or similar type. For this purpose one could make good use of an automatic filter.

Attempts have been made to automatize the method of filtering whereby, for example, an apparatus has been designed for feeding filter papers into filter cups and removing the same. It is, however a most complicated method which does not give full automation.

Further, apparatus is to be found having rotatable tables for collecting measured amounts of liquid in different vessels, and immersion apparatus for treating preparations having a different liquid, whereby the different vessels are arranged on two circular tables arranged above each other. Similarly a rotatable stand for filtering purposes is known.

The invention intends to provide an automatic filter which gives a repeated automatic filtering. This is achieved according to the invention through a regeneratable arrangement which includes preferably three cylindrical blocks, whereupon the intermediate block is first provided with at least two regeneratable filter discs of sintered glass located in cut away portions, and secondly is rotatable in the horizontal plane around the central shaft so that each of its cut away sections can be placed in communication with various channels in the upper or lower block respectively. It is thus suitable to provide the intermediate block with a ring of gearteeth which is mechanically connected to a drive device, for example an electric motor. This can suitably be programme guided.

According to a further embodiment of the arrangement according to the invention some of the channels can be provided with seals at the sliding surfaces between the blocks, for example, so as to give suction to the filtrate through a vacuum. The sealing rings can advantageously be comprised of polytetrafluoroethylene which presents good chemical resistance. According to a special embodiment of the invention, several of the blocks are rotatable in the horizontal plane in arbitrary directions around the central shaft and/or can be locked in mutually different positions. Finally the block can advantageously be manufactured from a transparent material, for example Plexiglas, in order to allow visual inspection of different working cycles.

Figure 1:
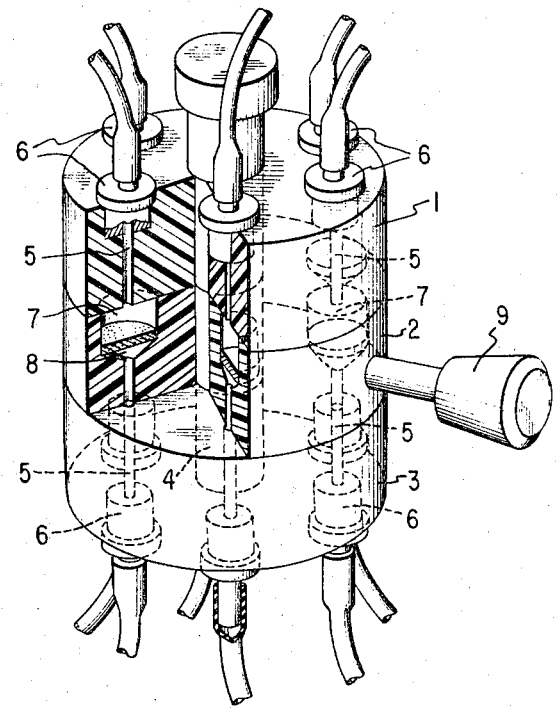
Figure 2:
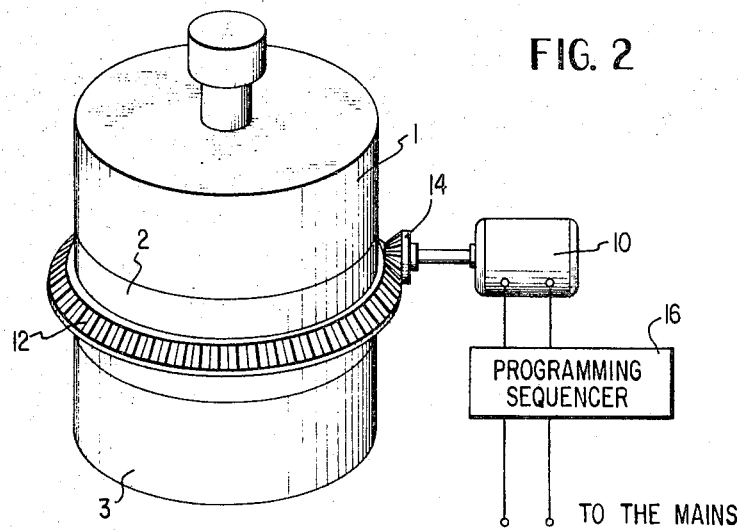

An example of the invention shall be described in connection with the attached drawing wherein FIG. 1 shows in perspective an automatic regulatable filter partly in section and FIG. 2 shows a modified automatic filter and drive means.

The apparatus according to this example consists of three round disc shaped blocks 1, 2 and 3 wherein the intermediate block 2 is movable about a central shaft 4. Channels 5 extend through blocks 1 and 3, which channels, at the top of block 1 and at the bottom of block 3, are provided with hose connections 6. In block 2 six cut away sections 7 are spaced at regular mutual distances corresponding to the distance between the channels 5 in the blocks 1 and 3. Filter discs 8 of sintered glass are inserted in the cut away portions 7. The middle block 2 which is rotatable around the centre shaft 4 can, according to the figure, by means of a lever 9 be rotated in any direction in the horizontal plane so that the cut away sections 7 can communicate with the different channels 5 in the upper or lower block respectively.

The apparatus according to the invention has been developed for filtering and the subsequent regeneration of the filter. The apparatus shall thus present two filters, one for filtering and one for instantaneously carrying out the regenerating process. It can, however, also be required, subsequent to filtering, to carry out other working cycles, such as after-treatment of the residue on the filter, by means of bleaching, washing, dissolving or other existing methods, before the filter can be regenerated. The number of filters thus must be large, for example the same as the number of working operations.

The working method of the apparatus is therefore subjected to certain modifications. A function example of the apparatus according to the invention is as follows. The required number of connections 6 in the upper block are connected in rotation to one or more filling arrangements for liquids which should be filtered, possibly a reagent media, which should be added, flushing liquids, regenerating liquids, distilled water etc. In a similar way the connections 6 are connected to the lower block 3 having for example test tube holders, collecting vessels, discharge bowls, suction pumps or the like. Thus valves, cocks or the like can be connected to the connection conduits.

The first working step is that the fluid to be filtered is introduced. Filtering can be expedited by rotating the block 2, by means of the lever 9, until it is connected for vacuum at the same time as the next test passes the next filter. By rotating the block 2 one step further the first filter can be connected, for example, to a bleaching fluid, the second filter to a vacuum, whereas at the same time the next fluid which shall be filtered is passed to the third filter. Thereafter in the next step the first filter can be connected to regenerating fluid, which for example dissolves the sedimentation, at the same time as the fourth test is passed to the fourth filter the third fi'ter is connected to a vacuum and the second filter is leached. By rotating block 2 one step further the first filter which has just been regenerated is connected, for example, to distilled water and is washed at the same time, whilst the fifth test is being passed to the fifth filter the fourth test is connected to a vacuum, the third test is leached and the second test is regenerated etc.

An electric, so called, step motor 10 as shown in FIG. 2 can be used instead of the lever 9 for moving the centre block 2 stepwise. The centre block may be provided with a gear rack 12 which is in meshing engagement with level gear 14 on the drive shaft of the motor 10. The motor 10 may operate under the control of a program sequencer 16 whereby the motor 10 sequentially operates to index the block 2 to carry out the above mentioned working operations automatically.

The apparatus according to the invention is thus extremely suitable for automatic filtering and regenerating and for possible required working operations in connection therewith. Further, the apparatus permits manual, semi-automatic and automatic service. The embodiment shown on the drawing can, furthermore, be modified whereby for example all three blocks can be made to rotate independently of each other and so that some of them are retained by means of for example stop screws in mutually arbitrary required positions, which permits further variable possibilities with respect to their working program.

Although the invention has been described in connection to an embodiment of the same it can in an arbitrary manner be varied within the scope of the following claims.

What I claim is:

1. An automatic medical fluid filtering apparatus comprising three cylindrical blocks disposed adjacent to each other on a common central axis, the outer blocks each having an equal number of equally spaced apart parallel channels extending therethrough parallel to said axis and disposed in a circle concentric to said axis, connecting means for connecting said channels to medical test fluids, reagents, solvent fluids, vacuum and washing fluid, the intermediate block having a corresponding number of apertures extending therethrough parallel to said axis and aligned with said channels in said outer block, a regeneratable filter disc of sintered glass disposed in each of said apertures, said intermediate block being disposed in sealed relation to said outer blocks and being rotatable about said axis relative to said outer blocks whereby each of said filters may be sequentially aligned with each of said channels in said outer block to enable each of said filters to be sequentially connected to the test fluid, reagent fluids, solvent fluids, suction and washing fluids, and means for sequentially indexing said intermediate block about said axis in a step-by-step manner.

2. An automatic medical fluid filtering apparatus as set forth in claim 1 wherein said intermediate block is provided with a ring of gear teeth and further comprising program controlled motor means mechanically connected to said ring of gear teeth to rotate said intermediate block about said axis in a step by step manner.

References Cited

UNITED STATES PATENTS

| | | | |
|---|---|---|---|
| 2,127,360 | 8/1938 | Helle et al. | 210—396 X |
| 2,304,142 | 12/1942 | Bickford | 210—446 X |
| 2,617,986 | 11/1952 | Miller | 210—330 X |
| 3,002,922 | 10/1961 | Baddour | 210—209 X |
| 3,201,921 | 8/1965 | Heyes | 210—330 |
| 3,222,135 | 12/1965 | Ashmead | 23—253 |

SAMIH N. ZAHARNA, *Primary Examiner.*